United States Patent [19]

Tsukada et al.

[11] 4,293,880
[45] Oct. 6, 1981

[54] APPARATUS FOR RECORDING AND REPRODUCING VIDEO SIGNALS AT SELECTABLE DIFFERENT TAPE TRAVELING SPEEDS FROM A PLURALITY OF PAIRS OF VIDEO HEADS

[75] Inventors: Haruo Tsukada; Yohichiroh Nakatani, both of Mito, Japan

[73] Assignee: Victor Company of Japan, Ltd., Yokohama, Japan

[21] Appl. No.: 83,326

[22] Filed: Oct. 10, 1979

[30] Foreign Application Priority Data

Oct. 16, 1978 [JP] Japan .................. 53-141979[U]

[51] Int. Cl.³ .................. H04N 5/78; G11B 15/44
[52] U.S. Cl. .................. 360/10; 360/64
[58] Field of Search .................. 360/10, 61, 64, 66, 360/70, 73, 83, 84, 87

[56] References Cited

U.S. PATENT DOCUMENTS

| | | | |
|---|---|---|---|
| 3,838,451 | 9/1974 | Mino | 360/10 X |
| 3,925,816 | 12/1975 | Kihara | 360/66 X |
| 3,959,819 | 5/1976 | Kubo | 360/10 X |
| 3,968,518 | 7/1976 | Kihara et al. | 360/10 X |
| 4,035,843 | 7/1977 | Tanimura | 360/10 X |
| 4,040,101 | 8/1977 | Zoellner et al. | 360/10 X |
| 4,079,426 | 3/1978 | Umeda et al. | 360/61 X |
| 4,197,562 | 4/1980 | Kikuya et al. | 360/64 X |

FOREIGN PATENT DOCUMENTS

| | | | |
|---|---|---|---|
| 43-11421 | 3/1968 | Japan | 360/10 |
| 43-36859 | 5/1968 | Japan | 360/10 |

Primary Examiner—John H. Wolff
Assistant Examiner—Aristotelis M. Psitos

[57] ABSTRACT

A video signal recording and reproducing apparatus comprises at least two pairs of video heads respectively mounted at different positions on diametrically opposite sides of a rotary member rotating at a predetermined speed and recording and reproducing video signals on and from parallel tracks disposed obliquely relative to the tape longitudinal direction of a tape, a switching circuit for selectively rendering at least one pair of video heads among the at least two pairs of video heads operative substantially in responsive correspondence with each of at least two recording and reproducing modes, and a tape driving system for driving the tape at different speeds in conformance with each of said recording and reproducing modes. The pairs of video heads operating in correspondence with each mode have their track widths respectively determined for forming tracks contiguously without gaps therebetween on the tape traveling at a speed conforming to the mode.

6 Claims, 10 Drawing Figures

APPARATUS FOR RECORDING AND REPRODUCING VIDEO SIGNALS AT SELECTABLE DIFFERENT TAPE TRAVELING SPEEDS FROM A PLURALITY OF PAIRS OF VIDEO HEADS

BACKGROUND OF THE INVENTION

The present invention relates to apparatus for recording and reproducing video signals on and from a magnetic tape whose traveling speed can be selectably changed. More particularly, the invention relates to an apparatus for recording and reproducing video signals on and from a magnetic tape which is traveling at a speed in accordance with a mode selected from between a long-time recording and reproducing mode and a short-time recording and reproducing mode.

The conventional video signal recording and reproducing system, ordinarily, forms tracks on a recording tape in a manner which leaves an unrecorded zone or band called a guard band between neighboring tracks in order to prevent the generation of beats between the signals of neighboring tracks due to tracking deviation of the head at the time of reproduction. However, in the above mentioned system, since unrecorded bands are provided between tracks, the utilization efficiency of the tape has been poor.

Accordingly, the assignee of the present invention has previously developed a system wherein tracks are formed on a tape without gaps or guard bands between neighboring tracks. Moreover, a color video signal can be recorded and reproduced on such a tape without the occurrence of interference beat disturbance. This system is described in U.S. patent application Ser. No. 731,935 entitled "Color video signal recording and/or reproducing system" filed Oct. 13, 1976, now U.S. Pat. No. 4,178,606 and assigned to the assignee of this application. In this previously developed system, a pair of azimuth heads have gaps which are inclined at a certain azimuth angle, in opposite directions from a line perpendicular to the longitudinal direction of the track. Neighboring tracks are formed in contiguous contact side-by-side without a gap or guard band therebetween. The phase of the chrominance signal is shifted by 90 degrees for every horizontal scanning period. The direction of this phase shifting is reversed from one track to the next. In accordance with this system, the tape utilization efficiency is high since the tracks are in close proximity to each other. Moreover, there is no beat disturbance.

On the one hand, in apparatuses for recording and reproducing video signals, the accompanying audio signal is generally recorded by a stationary head. For this reason, as the traveling speed of the magnetic tape is increased, the recording and reproducing characteristics and S/N ratio of the audio signal are improved, and, in addition, noise due to wow and flutter of the magnetic tape becomes relatively less. On the other hand, as the traveling speed of the magnetic tape is increased, the recording and reproducing time for the same length of the magnetic tape becomes shorter.

Accordingly, a video signal recording and reproducing apparatus which can be selectively operated, according to the purpose of use, in a shorttime recording and reproducing mode having a high magnetic tape traveling speed and a long-time recording and reproducing mode having a low magnetic tape traveling speed has been reduced to practice in a concrete form. Since recording and reproducing are carried out with the tape driven at a high speed in the shorttime recording and reproducing mode, the recording and reproducing time is short for the same tape length, but the audio signal is recorded and reproduced with good characteristics. In the long-time recording and reproducing mode, although the characteristics of the audio signal are somewhat inferior to those in the case of the short-time recording and reproducing mode, recording and reproducing of the video signal and the audio signal for an even longer period can be carried out.

In a video signal recording and reproducing apparatus of this heretofore known kind, however, the track width of the magnetic head, the traveling speed of the magnetic tape and other values are so set that the tracks are formed without gaps therebetween in the long-time recording and reproducing mode. For this reason, in the short-time recording and reproducing mode, gaps are formed between adjacent tracks, whereby guard bands are substantially formed, as described more fully hereinafter in conjunction with a drawing. As a disadvantageous consequence, the utilization of the tape at the time of this short-period recording and reproducing mode has been poor.

SUMMARY OF THE INVENTION

Accordingly, it is a general object of the present invention to provide a novel and useful apparatus for recording and reproducing video signals in which the above described disadvantages have been overcome.

Another and specific object of the invention is to provide a video signal recording and reproducing apparatus in which a first pair of magnetic heads for long-time recording and reproducing of a certain track width and a second pair of magnetic heads for short-time recording and reproducing of a greater track width are provided and are selectively used by being changed over according to the long-time or short-time recording and reproducing mode. By this provision according to the invention, the tracks are formed without gaps, and the utilization of the tape is good not only in the long-time recording and reproducing mode but also in the short-time recording and reproducing mode. Particularly in the short-time recording and reproducing mode, the parts heretofore left as gaps on the magnetic tape are also used for recording and reproducing. For this reason, recording and reproducing at a high S/N ratio can be achieved. Furthermore, occurrence of dropout is reduced.

Further objects and features of the invention will be apparent from the following detailed description when read in conjunction with the accompanying drawings.

DETAILED DESCRIPTION OF THE INVENTION

Figure 1:
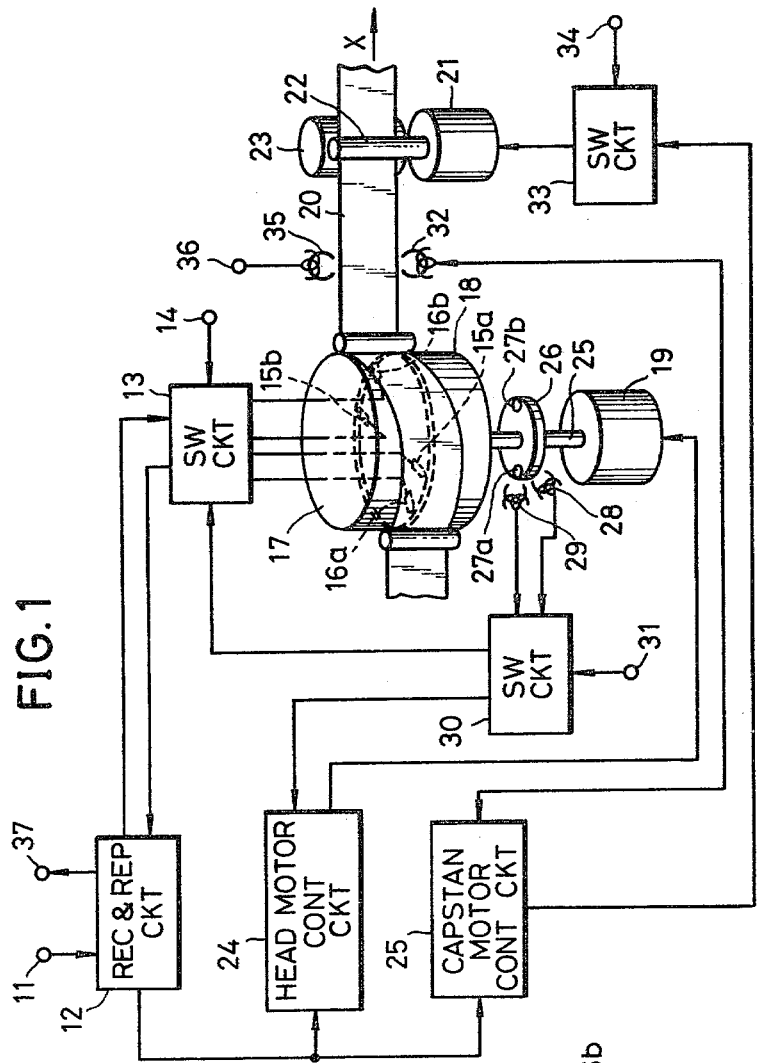
FIG. 1 is a block diagram of one embodiment of the video signal recording and reproducing apparatus according to the present invention.

In FIG. 1 a video signal to be recorded is introduced into the apparatus through an input terminal 11, is passed through a recording and reproducing circuit 12, and is supplied to a switching circuit 13. The switching circuit 13 is switched over in accordance with a mode setting signal applied through a terminal 14, in such a manner that the signal from the recording and reproducing circuit 12 is fed to a pair of video heads 15a and 15b in the long-time recording and reproducing mode and to another pair of video heads 16a and 16b in the short-time recording and reproducing mode.

Figure 2:
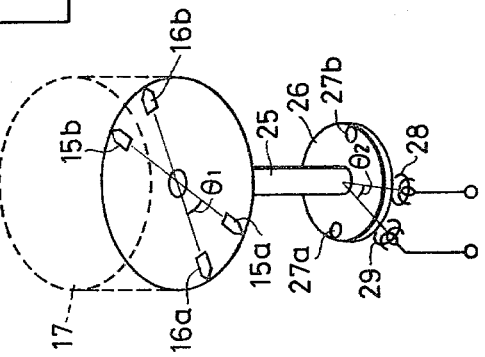
FIG. 2 is a diagrammatic perspective view showing an arrangement of rotary heads and pickup heads.

The video heads 15a and 15b have oppositely oriented azimuths and are mounted on diametrically opposite sides of a rotary drum 17, which is rotated at a rotational speed of 30 rps by a head motor 19. The video heads 16a and 16b similarly have oppositely oriented azimuths and are mounted on diametrically opposite sides of the rotary drum 17 and are separated by a specific angle $\theta1$ with respect to the video heads 15a and 15b (refer to FIG. 2). In the present embodiment, the video heads 16a and 16b have a track width which is substantially two times the track width of the video heads 15a and 15b as described hereinafter.

A modification may be made in which the video heads 15a, 15b, 16a, and 16b are mounted to a rotary member such as a rotary disc or rotary bar rotated by the head motor 19.

A magnetic tape 20 is wrapped obliquely around the rotary drum 17 and a stationary drum 18. The tape is driven in the arrow direction X by means of a capstan 22 driven by motor 21 and a pinch roller 23. A video signal is recorded by the video heads 15a and 15b, or 16a and 16b which alternately trace along tracks on the tape 20, successively one field per track. The tracks are positioned contiguously to each other and obliquely relative to the longitudinal direction of the tape.

On the other hand, a vertical synchronizing signal which has been separated from the video signal in the recording and reproducing circuit 12 is supplied to a head motor control circuit 24 and a capstan motor control circuit 25.

Figure 6:
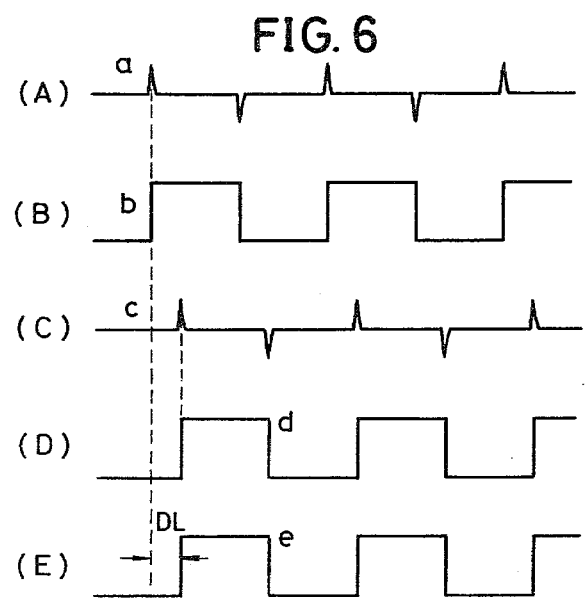
FIGS. 6(A) through 6(E) are diagrams respectively indicating the waveforms of rotation detection pulses and drum pulses formed therefrom.

The rotary drum 17 is coaxially mounted on a vertical rotating shaft 25, which is driven by the motor 19 and rotates together with the rotary drum 17. A pair of magnets 27a and 27b of opposite polarity are mounted on a rotating disc 26 fixed coaxially to the rotating shaft 25. As the rotary drum 17 rotates, pulses a and c of positive polarity and negative polarity as indicated in FIGS. 6(A) and 6(C) are picked up alternately by pickup heads 28 and 29 and are supplied to a switching circuit 30. The pickup heads 28 and 29 are disposed to face the rotating disc 26, and are separated from each other by an interval of angle $\theta2$ (where, $\theta2=\theta1$). In a case where $\theta2\neq\theta1$, the picked-up signal may be corrected to obtain the same result in the case where $\theta2=\theta1$.

The switching circuit 30 is switched over in accordance with a mode setting signal applied through a terminal 31 in a manner such that the signal from the head 28 is supplied to the head motor control circuit 24 when the long-time recording and reproducing mode is in use and the signal from the head 29 is supplied to the control circuit 24 when the short-time recording and reproducing mode is in use.

The head motor control circuit 24 is supplied with a drum pulse b or d as indicated in FIG. 6(B) or 6(D), which has been formed from a picked-up signal a or c in the switching circuit 30, and further with a vertical synchronizing signal from the recording and reproducing circuit 12. The control circuit 24 resultingly forms a control signal, which is then applied to the head motor 19. Accordingly, the rotational phase of the head motor 19 is so controlled that the video heads 15a and 15b or 16a and 16b form tracks and record the vertical synchronizing signal at the longitudinal edge of each track.

The capstan motor control circuit 25, when the recording mode is in use, forms a control signal, which is thereafter supplied to a control head 32. By this control head 32 the control signal is recorded at one lateral edge of the tape 20 along a track in the longitudinal direction of the tape 20. At the time of reproduction, the control signal is reproduced by the control head 32 and is formed into a specific capstan control signal by the capstan motor control circuit 25 and is thereafter supplied to a switching circuit 33. The capstan motor 21 is of a structural organization which includes, for example, a driving coil composed of a two-phase winding and a four-phase winding. The switching circuit 33 is switched over in accordance with a mode setting signal applied from a terminal 34 so that the control signal from the capstan motor control circuit is supplied to the four-phase winding driving coil of the motor 21 when the long-time recording and reproducing mode is in use, and alternatively to the two-phase winding driving coil when the short-time recording and reproducing mode is in use. Accordingly, in the present embodiment, the capstan 22 is rotated, in the short-time recording and reproducing mode, at a speed which is twice that for the long-time recording and reproduction, whereby the tape 20 is driven at double speed.

An audio signal is introduced through a terminal 36 to an audio head 35, by which the signal is recorded on an audio track at the opposite lateral edge of the tape 20 and is reproduced from the track.

When long-time recording is first to be carried out on a tape of a specific length, the apparatus is set to the long-time recording and reproducing mode. In this mode, the long-time recording and reproducing mode signal is applied to the terminals 14, 31, and 34. Accordingly, the respective switching circuits 13, 30, and 33 are switched thereby to cause the video heads 15a and 15b, the pickup head 28, and the four-phase winding driving coil of the capstan motor 21 to assume their operational states.

Figure 3:
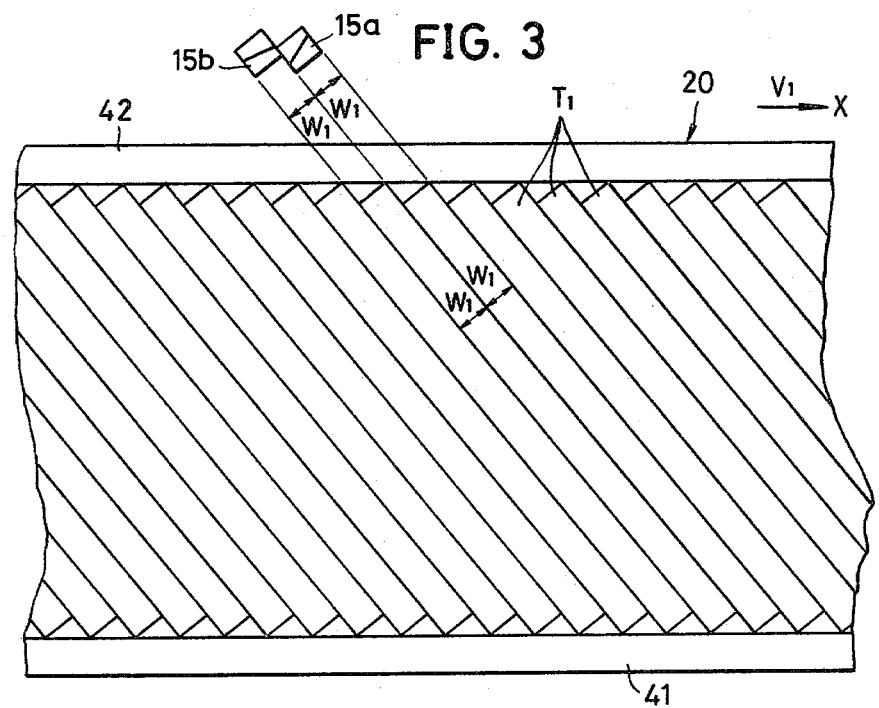
FIG. 3 is a diagram indicating a track pattern on the magnetic tape in the long-time recording and reproducing mode of the apparatus of the present invention.

As a consequence, the tape 20 is driven at a relatively low speed VI, and the video signal is recorded by the video heads 15a and 15b on the tracks T1 which are formed contiguously to each other with no space left therebetween and obliquely relative to the longitudinal direction of the tape 20, as indicated in FIG. 3. The gaps of the video heads 15a and 15b have oppositely oriented azimuths and have the same track width W1. Accordingly, tracks T1 are formed which have substantially the width W1.

Here, since the recorded video signal has been frequency modulated, when one video head scans and records a new signal with an overlap over a part of a track which has been previously recorded by the other video head, the previously recorded signal thus overlapped is erased. Moreover, since the azimuth of the video head and the azimuth of the track adjacent to the track scanned by this video head are opposite to each other, even when the video head scans with an overlap over an adjacent track part at the time of reproduction, the azimuth loss in reproduction is sufficiently large so that the adjacent track is not substantially reproduced. In this connection, it is to be understood that the track width of the video head may be larger than the width W1 of the track provided that the recorded tracks T1 have the predetermined width W1 and are positioned contiguously to each other. This also applies to the video heads 16a and 16b described later.

Pulse a (FIG. 6(A)) picked up by the pickup head 28 is supplied to the head motor control circuit 24, where it is formed into a drum pulse b (FIG. 6(B)). The rotation of the motor 19 is resultingly controlled in such a manner that the video heads 15a and 15b will record the vertical synchronizing signal of the video signal near the longitudinal end of the tracks T1.

The control signal is recorded on a control track 41 by the control head 32. The audio signal is recorded on an audio track 42 by the audio head 35.

When the tracks T1 which have been recorded in the long-time mode as described above are to be reproduced, the tape 20 is driven at speed V1, the same as for the long-time recording mode. The video signals reproduced by the video heads 15a and 15b, one field per head, are supplied to the switching circuit 13, where they are subjected to switching based on the drum pulse from the switching circuit 30, and are thus combined into a continuous video signal. The resulting output signal is demodulated in the recording and reproducing circuit 12 and is led out through an output terminal 37 as a reproduced signal.

Since the linear speed of the rotating video heads is much greater than the tape traveling speed, the relative linear speed of the video head with respect to the tape varies little regardless of the tape traveling speed, while, since the audio head 35 is a stationary head, the relative speed of the audio head with respect to the tape depends on the tape traveling speed itself.

In this connection, when a long recording time is not required, or alternatively when an audio signal having a good frequency characteristic is desired, it is necessary to increase the tape traveling speed. For the purpose of increasing the tape traveling speed, the apparatus is set to the short-time recording and reproducing mode. In this mode, the short-time recording and reproducing mode signal is applied to the terminals 14, 31, and 34, and the respective switching circuits 13, 30, and 33 are then switched over thus causing the video heads 16a and 16b, the pickup head 29, and the twophase winding driving coil of the capstan motor 21 to assume their operational states. As a consequence, the tape 20 travels at a speed V2 which is twice the above described speed V1.

Figure 4:
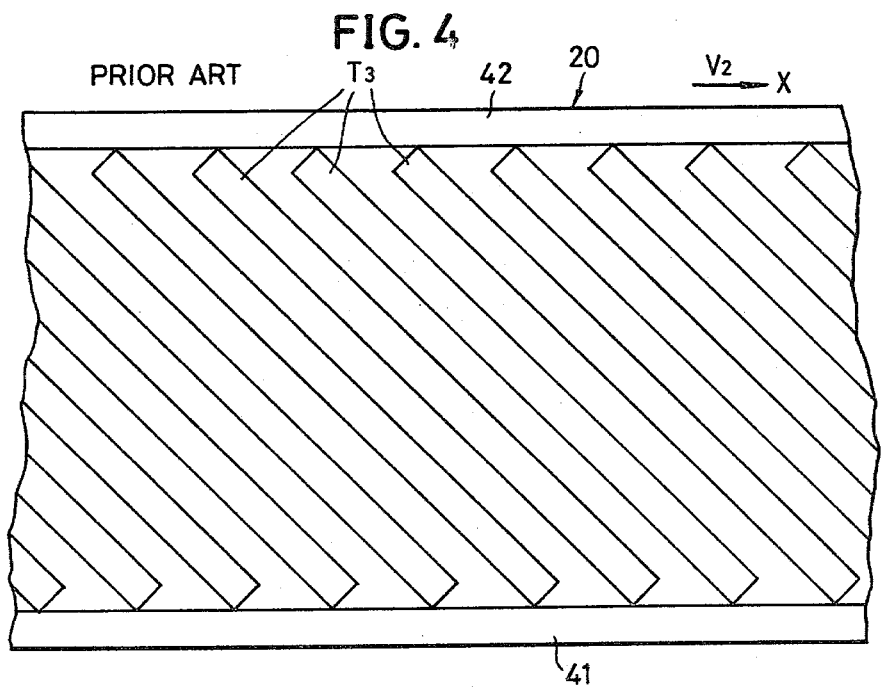
FIG. 4 is a diagram indicating a track pattern on the magnetic tape in the short-time recording and reproducing mode of the apparatus known heretofore.

Heretofore, the shorttime recording and reproducing mode of operation has been performed in a manner such that the traveling speed of the tape 20 is merely doubled and the video heads used for long-time recording and reproducing are also used for recording and reproducing the video signal. The width of these video heads are determined so that the tracks are formed contiguously to each other without gaps therebetween on the tape at the time of long-time recording and reproducing mode. Accordingly, when recording tracks are formed on a tape which has been sped up, for example, by two times, through the use of the above described video heads, the resulting track pattern becomes such that a gap corresponding substantially to one track is formed between each pair of neighboring tracks T3, as indicated in FIG. 4. The size of this gap increases with the increase in tape traveling speed. Since these gaps on the tape are not used for recording and reproduction, this method has been accompanied by a difficulty in that the utilization efficiency of the tape has been poor.

Accordingly, the apparatus of the present invention s adapted to overcome this difficulty.

Figure 5:
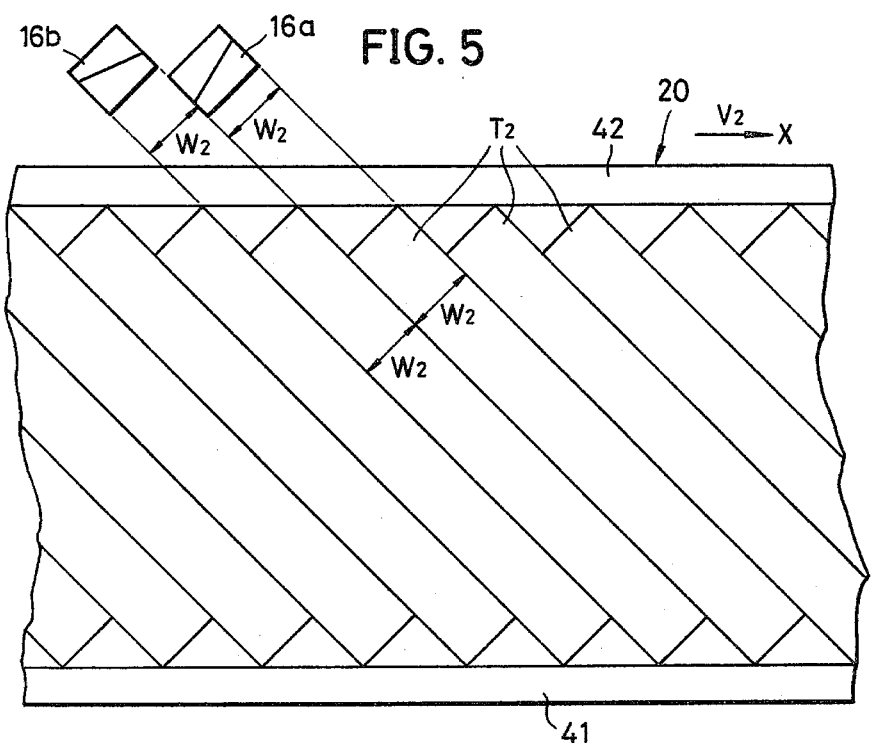
FIG. 5 is a diagram showing a track pattern on the magnetic tape in the short-time recording and reproducing mode of the apparatus of the present invention.

That is, in the short-time recording and reproducing mode, the video signal is recorded by the video heads 16a and 16b to form tracks T2 positioned obliquely relative to the longitudinal direction of the tape 20 and contiguously to each other without gaps therebetween, as indicated in FIG. 5. The video heads 16a and 16b have gaps with oppositely oriented azimuths and have a track width W2 wider than the width W1. Accordingly, the tracks T2 having a width that is substantially W2 are formed. In the present embodiment, the width W2 is substantially two times the width W1.

Pulses c (FIG. 6(C)) picked up by the pickup head 29 are formed into drum pulses d (FIG. 6(D)) in the switching circuit 30. The rotation of the head motor 19 is controlled by the control signal from the head motor control circuit 24 in a manner such that the video heads 16a and 16b will record the vertical synchronizing signal of the video signal near the longitudinal end of the tracks T2.

The control signal and the audio signal are respectively recorded by the heads 32 and 35 on the control track 41 and the audio track 42.

When the tracks T2 which have been recorded in the short-time mode as described above are to be reproduced, the tape 20 is driven at speed V2, the same as for the short-time recording mode. The video signals reproduced by the video heads 16a and 16b are supplied to the switching circuit 13. There, the video signal are subjected to switching based on the drum pulse from the switching circuit 30, and are thus combined into a continuous video signal. The head 35 reproduces the audio signal. Here, since the audio signal is recorded on and reproduced from the tape 20 traveling at the high speed V2, there can be obtained a reproduced audio signal with a good frequency characteristics.

According to the apparatus of the present invention, as is apparent from a comparison of FIG. 4 and FIG. 5, in the short-time recording and reproducing operational mode, the video signals are recorded on large-width tracks T2 that are in contiguous contact without gaps therebetween and are reproduced from the tracks T2 thus formed. Accordingly, the tape is utilized efficiently for recording and reproducing the video signal, and the tape utilization efficiency is high. In addition, since the width of the video track T2 is large, the S/N ratio of the video signal is improved, and, moreover, occurrence of dropout is reduced greatly.

While in the embodiment set forth above, the speed V2 is set to be about two times the speed V1, and the track width of the video heads 16a and 16b is set to be about two times that of the video heads 15a and 15b, this invention is not limited to this embodiment. The speed V2 may be set to be three times the speed V1, or set to any other appropriate value larger than the speed V1. In such cases, the track width selected or the video heads 16a and 16b with regard to speed V2 will be such that tracks T2 will be formed in contiguous contact one to the next without any gap therebetween. Furthermore, the number of pairs of video heads used is not limited to two pairs but may be any plurality of pairs.

A modification of the above described embodiment may be one of organization in which only the pickup head 28 is provided instead of the two pickup heads 28 and 29. In this case, a delay circuit is provided inside the switching circuit 30. This switching circuit 30 operates, in the long-time recording and reproducing mode, to form the drum pulse b (FIG. 6(B)) based on the pulse a (FIG. 6(A)) from the pickup head 28 and to supply the resulting drum pulse b to the head motor control circuit 24. On the other hand, in the short-time recording and reproducing mode, in the switching circuit 30, the drum pulse b (FIG. 6(B)) that is formed based on the pulse a is passed through the delay circuit to produce as output drum pulse e (FIG. 6(B)) delayed by a predetermined time DL with respect to the drum pulse b. The resulting drum pulse e is substantially equivalent to the drum pulse d obtained through the use of the pickup head 29.

According to this modification, the pickup head 29 can be eliminated, whereby the structural organization can be proportionally simplified.

Further, this invention is not limited to these embodiments. Variations and modifications may be made without departing from the scope of the invention.

What we claim is:

1. An apparatus which selectively records and reproduces video signals on and from a tape in parallel tracks which are disposed obliquely relative to the longitudinal direction of the tape, and in any of a plurality of different tape speed modes, every field of the video signals being recorded and reproduced in a normal speed of picture motion for each of said different tape speed modes, said apparatus comprising:
   a rotary member rotating at a predetermined speed;
   a plurality of pairs of video heads for recording and reproducing the video signals on and from the tape, each of said pairs of video heads corresponding to one of said tape speed modes respectively and being mounted at different positions on a periphery of the rotary member with two video heads of each of said pairs diametrically disposed on opposite sides of the rotary member;
   means for selecting one of said pairs of video heads to operate in conformance with one of the selected tape speed modes; and
   means for driving the tape at a speed which is selected in conformance with said one selected tape speed mode;
   the pair of video heads operating in conformance with the selected tape speed mode and having a track width selected for forming contiguous tracks without gaps therebetween on said tape traveling at the selected tape speed mode.

2. An apparatus which selectively records and reproduces video signals on and from a tape, with the recording being in parallel tracks disposed obliquely relative to the longitudinal direction of the tape in a long-time recording and reproducing mode or a short-time recording and reproducing mode, every field of the video signals being recorded and reproduced in each of said modes in a normal speed of picture motion, said apparatus comprising:
   a rotary member rotating at a predetermined speed;
   first and second pairs of video heads for recording and reproducing the video signals on and from the tape;
   said first and second pairs of video heads being mounted at different positions on a periphery of the rotary member, said mounting being such that the video heads of each of said pairs are disposed on diametrically opposite sides of the rotary member;
   means for selecting either the first pair or the second pair of video heads in conformance with a selection of either the long-time recording and reproducing mode or the short-time recording and reproducing mode respectively; and
   means for selectively driving the tape at a first speed or a second speed in conformance with the selection of the long-time or short-time recording and reproducing mode, said second speed being higher than said first speed,
   said first and second pairs of video heads having track widths for forming tracks contiguously and without gaps therebetween on said tape while it is traveling at said first or second speeds, the track width of the second pair of video heads being larger than the track width of the first pair of video heads.

3. The video signal recording and reproducing apparatus as claimed in claim 1 which further comprises:
   a head motor for rotating said rotary member;
   rotation detection means for detecting the rotation of said rotary member and for generating pulses having a timing corresponding to a timing of the pair of video heads while in operation; and
   means for controlling the phase of rotation of said head motor responsive to output pulses of said rotation detection means, whereby said pair of video heads records vertical synchronizing signals for said video signals near the longitudinal edge of said track.

4. The video signal recording and reproducing apparatus as claimed in claim 2 which further comprises:
   a head motor for rotating said rotary member;
   rotation detection means comprising a rotating disc which turns together with said rotary member, and first and second detection heads being disposed at different positions to confront said rotating disc for detecting the rotation of said rotating disc; and
   head motor rotational phase controlling means for producing output control signals by selectively using the outputs of said first and second detection heads in correspondence with the long-time and short-time recording and reproducing modes, said control signal being supplied to said head motor to control the rotational phase thereof, whereby said pair of video heads in operation corresponds with the mode record vertical synchronizing signals for said video signals near the longitudinal edge of said track.

5. The video signal recording and reproducing apparatus as claimed in claim 2 which further comprises:
   a head motor for rotating said rotary member;
   rotation detection means comprising a rotating disc which turns together with said rotary member, and a detection head confronting said disc for detecting the rotation of said disc; and
   head motor rotational phase controlling means having means for delaying the output of said detection head by a predetermined period of time, for producing an output control signal by selectively using an output of said detection head and an output of said detection head passed through said delay means in correspondence with the long-time and short-time recording and reproducing modes, said control signal being supplied to said head motor to control the rotational phase thereof, whereby said pair of video heads operate in correspondence with the mode record vertical synchronizing signals for said video signals near the longitudinal edge of said track.

6. The video signal recording and reproducing apparatus as claimed in claim 2 in which said second speed is two times said first speed, and the track width of said second video head is approximately two times the track width of said first video head.

* * * * *